United States Patent
Shah et al.

(10) Patent No.: US 11,851,104 B2
(45) Date of Patent: Dec. 26, 2023

(54) LOWER CONTROL ARM MECHANISM FOR A SMALL OVERLAP CRASH

(71) Applicant: Rivian IP Holdings, LLC, Plymouth, MI (US)

(72) Inventors: Anish Shah, Ann Arbor, MI (US); Mohammed Nomaan Khan, Farmington Hills, MI (US); Allen Orchard, Middlesex (GB)

(73) Assignee: Rivian IP Holdings, LLC, Plymouth, MI (US)

( * ) Notice: Subject to any disclaimer, the term of this patent is extended or adjusted under 35 U.S.C. 154(b) by 301 days.

(21) Appl. No.: 16/911,710

(22) Filed: Jun. 25, 2020

(65) Prior Publication Data

US 2021/0403089 A1 Dec. 30, 2021

(51) Int. Cl.
*B62D 21/11* (2006.01)
*B62D 21/15* (2006.01)
*B60G 7/00* (2006.01)

(52) U.S. Cl.
CPC .............. *B62D 21/11* (2013.01); *B60G 7/001* (2013.01); *B62D 21/15* (2013.01)

(58) Field of Classification Search
CPC ...... B62D 21/11; B62D 21/15; B62D 25/082; B62D 21/152; B60G 7/001; B60G 2204/1431; B60G 2204/4302; B60G 2206/016; B60G 7/02; B60G 7/008
See application file for complete search history.

(56) References Cited

U.S. PATENT DOCUMENTS

| | | | |
|---|---|---|---|
| 6,401,319 B1 * | 6/2002 | Hicks | B62D 65/12 269/900 |
| 6,957,846 B2 | 10/2005 | Saeki | |
| 8,532,881 B2 * | 9/2013 | Ostling | F16B 37/0864 296/190.04 |
| 9,150,252 B2 * | 10/2015 | Yasui | B60G 7/02 |
| 9,156,418 B2 | 10/2015 | Ramoutar et al. | |
| 9,663,050 B2 | 5/2017 | Nishida et al. | |
| 9,944,142 B2 | 4/2018 | Mohrlock | |
| 9,944,322 B2 * | 4/2018 | Baccouche | B62D 21/15 |
| 2015/0021891 A1 * | 1/2015 | Sangha | B62D 21/12 280/784 |

(Continued)

FOREIGN PATENT DOCUMENTS

CN 203198654 U * 9/2013
DE 10-2013-207376 A1 10/2014

*Primary Examiner* — Drew J Brown
(74) *Attorney, Agent, or Firm* — Haley Guiliano LLP

(57) ABSTRACT

A system for managing wheel kinematics during a collision event includes a break-away region for releasing a joint of a lower control arm. The system includes a recess arranged in a frame member, and a pin arranged vertically in the recess and configured to couple the lower control arm to the frame member. The break away region includes a reduced stiffness and is configured to fail under the collision event to allow the pin to move laterally out of the recess. The recess may be formed by a top plate and a bottom plate or a C-shaped bracket, which include through features to accommodate the pin. The break-away region includes a first notch and a second notch that reduce a stiffness of the structures that form the recess, thus allowing the pin to be released under a predetermined loading. The break-away region may fracture to release the pin.

19 Claims, 8 Drawing Sheets

(56) References Cited

U.S. PATENT DOCUMENTS

| | | | |
|---|---|---|---|
| 2015/0307133 A1* | 10/2015 | Mentzel | B62D 21/155 |
| | | | 280/784 |
| 2016/0332496 A1 | 11/2016 | Saudemont | |
| 2017/0015264 A1* | 1/2017 | Mohrlock | B60G 7/02 |
| 2017/0057546 A1* | 3/2017 | Dressel | B62D 21/152 |
| 2017/0073009 A1* | 3/2017 | Sangha | B62D 21/155 |
| 2017/0274717 A1* | 9/2017 | Mansfield | B60G 7/02 |
| 2018/0056744 A1* | 3/2018 | Larsson | B62D 21/155 |
| 2019/0118863 A1* | 4/2019 | Hara | B62D 25/20 |
| 2021/0024137 A1* | 1/2021 | Okamoto | B62D 21/11 |
| 2022/0097767 A1* | 3/2022 | Jeong | B62D 25/082 |

\* cited by examiner

LOWER CONTROL ARM MECHANISM FOR A SMALL OVERLAP CRASH

INTRODUCTION

The present disclosure is directed towards a lower control arm pullout, and more particularly towards a lower control arm pullout for desired wheel kinematics during a small overlap crash.

SUMMARY

Structures of the present disclosure are configured to provide sufficient lateral push to a vehicle so that a head-on collision can be mitigated. In some embodiments, the present disclosure is directed to a system for managing lateral loads in a vehicle. The system includes a crossmember and a load-transmitting structure, which may be deformable. The crossmember is arranged laterally spanning a first longitudinal frame member and a second longitudinal frame member of the vehicle. The first longitudinal frame member is arranged on a first side of the vehicle, and the second longitudinal frame member is arranged on a second side of the vehicle. The deformable structure is affixed to one lateral side of the vehicle, arranged longitudinally forward of the crossmember, arranged laterally outside of the first frame member, and configured to deform during a small overlap collision. While deforming, the structure applies a lateral force on a first end of the crossmember to cause lateral displacement of the vehicle. For example, the structure applies the lateral force directed towards the second side of the vehicle from the first side of the vehicle.

In some embodiments, the crossmember is rigidly affixed to the first longitudinal frame member and to the second longitudinal frame member. For example, in some embodiments, the crossmember is welded to both longitudinal frame members to form structurally rigid connections.

In some embodiments, the structure includes a wedge. The wedge includes a first face arranged along a laterally outer edge of the first frame member, and a second face arranged along a bumper system. For example, the first face and the second face are arranged at approximately 90° to each other. In some embodiments, the second face is configured to deflect towards the first face under the small overlap collision. For example, the wedge may deform to form a substantially sharper wedge angle, thus elongating in the longitudinal direction.

In some embodiments, the crossmember extends through a first opening in the first longitudinal frame member and a through a second opening in the second longitudinal frame member. For example, the cross member may have a substantially tubular cross section, of any suitable shape (e.g., circular, rectangular, rounded rectangular, or other suitable shape), which extends through each respective longitudinal frame member. In the further example, the ends of the crossmember may extend outboard of the respective longitudinal frame members. In some embodiments, the end of the crossmember is angled such that the front length of the crossmember is shorter than the rear length.

In some embodiments, the present disclosure is directed to a frame system that includes the system for managing lateral loads in a vehicle. For example, the frame system may include the crossmember, the structure, the longitudinal frame members, any other suitable components, or any suitable combination thereof. In some embodiments, the present disclosure is directed to a vehicle that includes the frame system.

In some embodiments, the frame system includes a second structure affixed to the second side of the vehicle. The second structure is arranged longitudinally forward of the crossmember, arranged laterally outside of the second frame member, and configured to deform during a small overlap collision to the second side. The second structure is configured to apply a lateral force on a second end of the crossmember to cause lateral displacement of the vehicle towards the first side.

In some embodiments, the present disclosure is directed to a structure for generating side loads in a vehicle during a small-offset collision that is configured to be arranged laterally outside of a longitudinal frame element of the vehicle, and wherein a crossmember is connected to the longitudinal frame member. The structure includes a sidewall (e.g., forming a wedge-shaped structure). The sidewall includes a first wall longitudinally oriented, a second wall laterally oriented, and a first spine angled to connect the first wall and the second wall. The structure also includes a second spine substantially parallel to the first spine, arranged inside of the sidewall. The structure also includes a plurality of ribs connecting the first spine and the second spine, connecting the second spine to the first wall and the second wall, or both. The structure is configured to deform when a load is applied to the second wall such that the first spine and the second spine align with an end of the crossmember to impart a lateral force on the crossmember. For example, in some embodiments, a profile of the sidewall, the second spine, and the plurality of ribs is made from extruded aluminum.

In some embodiments, the structure includes a plurality of holes arranged in the second face for coupling the structure to a bumper assembly of the vehicle. In some embodiments, the first wall is configured to be arranged along the longitudinal frame element, and the first wall does not include holes for affixing to the longitudinal frame element.

In some embodiments, the structure is configured to define when the load is applied to the second wall such that the first spine and the second spine are configured to align with respective walls of the crossmember.

In some embodiments, the structure includes a cover affixed on a top of the sidewall, the second spine, and the plurality of ribs. The cover is configured to be coupled to a body element of the vehicle.

In some embodiments, the first spine meets the first wall at a first curved interface, and the first spine meets the second wall at a second curved interface. For example, the structure may be substantially wedge shaped and include curved or segmented regions where walls meet. In a further example, in some embodiments, the structure includes a third wall longitudinally oriented to connect the second wall to the first spine.

In some embodiments, the first spine and the second spine include respective stiffnesses sufficient to transfer load to the crossmember. The plurality of ribs include respective stiffnesses to substantially maintain a distance between the first spine and the second spine, maintain alignment of the first spine and the second spine with the crossmember during the small offset collision, or both.

In some embodiments, the structure is made using a method that includes extruding aluminum along an axis, and then cutting the extrusion to form the structure. A billet is extruded along the axis to form a first extrusion having a first length and a cross-section. The cross-section (e.g., the profile) includes a sidewall having a first wall longitudinally oriented, a second wall laterally oriented, and a first spine angled to connect the first wall and the second wall. The cross-section also includes a second spine and a plurality of ribs. The second spine is substantially parallel to the first spine and arranged inside of the sidewall. The plurality of ribs connect the first spine and the second spine, connect the second spine to the first wall and the second wall, or both. The structure is configured to deform when a load is applied to the second wall such that the first spine and the second spine align with an end of the crossmember to impart a lateral force on the crossmember. The method includes cutting the extrusion at a first position along the axis, and then cutting the extrusion at a second position along the axis a predetermined length from the first position to form the structure. For example, the predetermined length defines the height of the structure when installed in a vehicle (e.g., from top to bottom). In some embodiments, the method includes forming a plurality of through features in the second wall for securing the structure to a vehicle. For example, the through features may include drilled holes or slots, machined holes or slots, any other suitable opening, or any combination thereof. In some embodiments, the method includes welding or otherwise securing (e.g., fastening) a top plate to a top side of the structure, a bottom plate to a bottom side of the structure, or both. For example, the top side and the bottom side are separated by the predetermined length.

In some embodiments, the present disclosure is directed to a structure that includes a sidewall (e.g., forming a wedge-shaped structure) including a first wall longitudinally oriented, a second wall laterally oriented, and a third wall angled to connect the first wall and the second wall. The structure includes a top plate arranged on top of and affixed to the sidewall, a bottom plate arranged below and affixed to the sidewall, and an intermediate plate arranged between the top plate and the bottom plate. The structure is configured to deform when a load is applied to the second wall such that the intermediate plate aligns with an end of the crossmember to impart a lateral force on the crossmember. For example, in some embodiments, the sidewall, the top plate, the bottom plate, and the intermediate plate are made of sheet steel. In a further example, the sidewall, the top plate, the bottom plate, and the intermediate plate are spot welded to form the structure. In some embodiments, the intermediate plate has a stiffness sufficient to transfer load to the crossmember.

In some embodiments, the structure includes a plurality of holes arranged in the second face for coupling the structure to a bumper assembly of the vehicle.

In some embodiments, the structure is configured to define when the load is applied to the second wall such that the intermediate plate is configured to align with respective walls of the crossmember.

In some embodiments, the present disclosure is directed to a system for managing wheel kinematics during a collision event. In some embodiments, the system includes a recess arranged in a frame member, a pin, a top plate, and a bottom plate. The pin is arranged vertically in the recess and configured to couple a lower control arm to the frame member. The top plate defines a top of the recess and includes a first through feature configured to accommodate the pin and constrain lateral motion of the pin, and a first break-away region including a reduced stiffness. The first break-away region is configured to fail under the collision event to allow the pin to move laterally out of the first through feature. The bottom plate defines a bottom of the recess and includes a second through feature configured to accommodate the pin and constrain lateral motion of the pin, and a second break-away region including a reduced stiffness. The second break-away region is configured to fail under the collision event to allow the pin to move laterally out of the second through feature.

In an illustrative example, in some embodiments, the first break-away region, the second break-away region, or both include one or more notches such as a first notch and a second notch. In a further illustrative example, the first break-away region includes a first region of the top plate arranged between a first notch and the first through feature, and a second region of the top plate arranged between a second notch and the first through feature. The first region and the second region are configured to fail during the collision event. In some embodiments, the first through feature, the second through feature, or both include a circular hole or a slot. In some embodiments, the first break-away region, the second break-away region, or both are configured to fail under the collision event by fracturing.

In some embodiments, a system for managing wheel kinematics during a collision event includes a lower control arm, a front mount, and a rear mount. The lower control arm is configured to couple a wheel to a frame member and includes a front portion and a rear portion. The front mount couples the front portion of the lower control arm to the frame member to form a first joint. The front mount includes a break-away region configured to fail under the collision event to allow the front portion to move laterally away from the front mount. The rear mount couples the rear portion of the lower control arm to the frame member forming a second joint configured to constrain lateral displacement of the second portion during the collision event.

In some embodiments, the front mount includes a through feature configured to accommodate a pin and constrain lateral motion of the pin. The pin couples the front portion of the lower control arm to the first mount. The break-away region is configured to fail during the collision event to allow the pin to move laterally out of the through feature. In an illustrative example, in some embodiments, the break-away region includes one or more notches such as a first notch and a second notch. In some embodiments, the break-away region includes a first region arranged between a first notch and the through feature, and a second region arranged between a second notch and the through feature. The first region and the second region are configured to fail during the collision event. For example, in some embodiments, the break-away region is configured to fail during the collision event by fracturing. In an illustrative example, the break-away region may be configured to fail under a load of 100 kN.

In some embodiments, the front mount includes a top through feature, a bottom through feature vertically aligned with the top feature, and a pin extending vertically through the top through feature and the bottom through feature. In some such embodiments, the front portion of the lower control arm is coupled to the pin, and the pin constrains lateral motion of the front portion of the lower control arm.

In some embodiments, the present disclosure is directed to a mount configured to constrain and release a front portion of a lower control arm. The mount includes a top through feature, a bottom through feature vertically aligned with the top feature, a pin extending vertically through the top through feature and the bottom through feature, and a break-away region. The front portion of the lower control arm is coupled to the pin, and the pin constrains lateral motion of the front portion of the lower control arm. The break-away region is configured to fail during a collision event to allow the front portion to move laterally away from the first through feature. In some embodiments, the break-away region includes one or more notches such as a first notch and a second notch. For example, in some embodiments, a first notch and a second notch reduce a stiffness of the first mount to fail under the collision event.

In some embodiments, the mount includes a top plate in which the top through feature is arranged, and a bottom plate in which the bottom through feature is arranged. In some such embodiments, the break-away region includes a first break-away region of the top plate and a second break-away region of the bottom plate.

In some embodiments, the mount includes a top section in which the top through feature is arranged, and a bottom section in which the bottom through feature is arranged. For example, the top section and the bottom section may be two sections of a single component such as a C-shaped bracket.

In some embodiments, the present disclosure is directed to a deflector apparatus for managing wheel kinematics during a small overlap collision event. The deflector apparatus includes a first section and a second section. The first section is arranged at an inside wall of a wheel well and substantially facing a wheel positioned in the wheel well. The first section comprises a hollow structure configured to absorb energy from the collision event by plastically deforming. The second section is arranged at an angle to the wheel and is configured to deflect the wheel laterally outwards from the vehicle away from an occupant compartment during the small overlap collision event. In an illustrative example, in some embodiments, the deflector apparatus is extruded from aluminum. For example, the first section and the second section may include extruded aluminum.

In some embodiments, the deflector apparatus is configured to be arranged at the base of a hinge-pillar. In some such embodiments, the deflector apparatus includes a set of through features configured to accommodate a corresponding set of fasteners affixed to the hinge-pillar. The hinge pillar provides support for a door hinge, for example.

In some embodiments, the deflector apparatus includes a set of through features configured to accommodate a corresponding set of fasteners affixed to a rear of the wheel well.

In some embodiments, the deflector apparatus includes an absorber arranged behind the first section and configured to further absorb energy from the collision event by plastically deforming. In some embodiments, the deflector apparatus includes an absorber arranged behind the frame coupler and configured to further absorb energy from the collision event by plastically deforming.

In some embodiments, the deflector apparatus includes a frame coupler configured to affix a frame system and a body system. The occupant compartment is formed by the body system, and the frame coupler is arranged behind the first section.

In some embodiments, the present disclosure is directed to a vehicle configured for managing wheel kinematics during a small overlap collision event. The vehicle includes a first wheel, a first wheel mount, a first wheel well configured to accommodate the first wheel, a frame system, an occupant compartment, and a deflector. The frame system includes a first pillar arranged at a first position, which is arranged at a rear and laterally outside portion of the first wheel well. The deflector is affixed in the first wheel well at the first position. The deflector includes a first section having a hollow structure configured to absorb energy from the collision event by plastically deforming, and a second section arranged at an angle to the first wheel and configured to deflect the first wheel laterally outwards from the vehicle to prevent intrusion of the first wheel into the occupant compartment during the collision event. In an illustrative example, in some embodiments, the deflector is extruded from aluminum.

In some embodiments, the deflector is configured to be arranged at the base of a hinge-pillar. In some such embodiments, the deflector includes a set of through features configured to accommodate a corresponding set of fasteners affixed to the hinge-pillar. In some embodiments, the deflector includes a set of through features configured to accommodate a corresponding set of fasteners affixed to a rear of the wheel well.

In some embodiments, the vehicle includes an absorber arranged behind the first section and configured to further absorb energy from the collision event by plastically deforming. In some embodiments, the vehicle includes an absorber arranged behind the frame coupler and configured to further absorb energy from the collision event by plastically deforming.

In some embodiments, the vehicle includes a frame coupler configured to affix a frame system and a body system. The occupant compartment is formed by the body system, and the frame coupler is arranged behind the first section.

In some embodiments, the wheel includes a plurality of radial spokes, and the deflector is configured to deflect the plurality of spokes away from the occupant compartment during the collision event. For example, in some embodiments, the wheel mount includes a lower control arm configured to direct the plurality of radial spokes to the deflector during the collision event.

In some embodiments, the present disclosure is directed to a system for managing wheel kinematics during a small overlap collision event of a vehicle. The system includes a frame system, a body system, a frame coupler, and a deflector. The frame system includes a first pillar arranged at first position at a laterally outside portion of a rear of the first wheel well. The body system includes an occupant compartment. The frame coupler at least partially affixes the frame system to the body system. The deflector is affixed to the frame coupler and faces a wheel in the first wheel well. The deflector includes a first section having a hollow structure configured to absorb energy from the collision event by plastically deforming, and a second section arranged at an angle to the wheel and configured to deflect the wheel laterally outwards from the vehicle to prevent intrusion of the wheel into the occupant compartment during the small overlap collision event. In some embodiments, the system includes an absorber arranged behind the frame coupler and that is configured to further absorb energy from the collision event by plastically deforming.

In some embodiments, a vehicle includes a crossmember and structure for generating lateral loads, a lower control arm configured to break-away, and a deflector, or any combination thereof, to manage loads during a collision event such as a small offset crash.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, the present disclosure is directed to structures arranged in the front of the vehicle, configured to affect the crashworthiness of a vehicle, particularly in small offset front collisions. The structures of the present disclosure may be designed to meet the most common mode of accidents, which are well-defined by the Insurance for Institute of Highway Safety (IIHS) and its test protocol on Small Overlap Rigid Barrier (commonly known as SORB). A vehicle may include structures and systems for managing loads, deformation, and kinematics during such a crash. For example, a vehicle may include a crossmember and structure for generating lateral loads to move the vehicle away from the barrier, a lower control arm configured to break-away to direct the wheel away from an occupant compartment, a deflector to aid in directing the wheel away from the occupant compartment, any other suitable features or components, or any combination thereof, to manage loads during a collision event such as a small offset crash.

The systems and structures of FIGS. 2-11 may be combined or otherwise modified to provide reduced intrusion into an occupant compartment from a small offset collision.

In some embodiments, the structures of the present disclosure address the issue of creating a cross-car load-path, which plays a role in deflection of the vehicle off of a barrier. In an illustrative example, the structures of the present disclosure include one or more wedges and a cross member. For example, the structure may include two wedges, one on either side of the vehicle, and a crossmember extending laterally across the frame of the vehicle.

Figure 1:
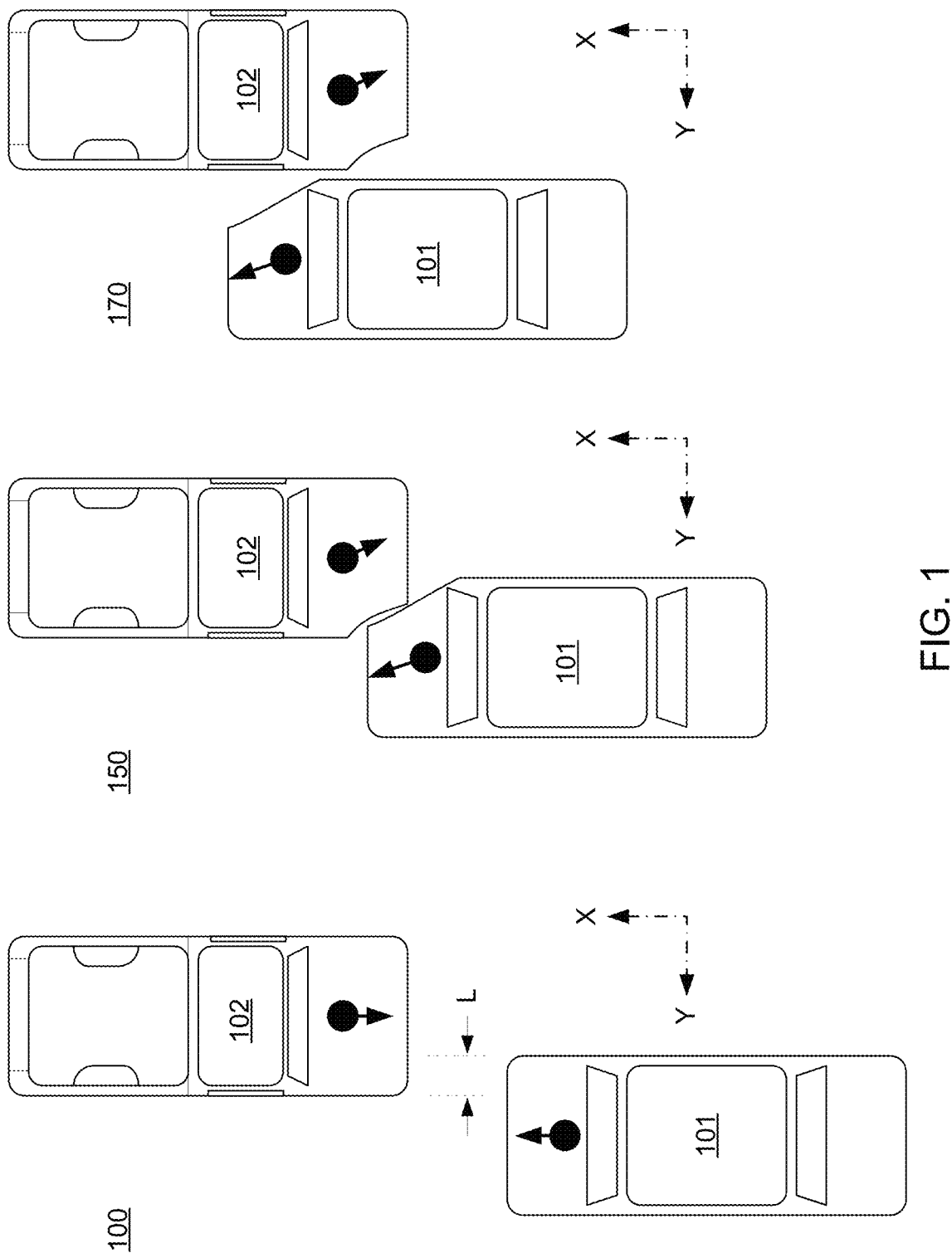
FIG. 1 shows several arrangements of vehicles during a small overlap collision, in accordance with some embodiments of the present disclosure.

FIG. 1 shows several arrangements of vehicles 101 and 102 during a small overlap collision, in accordance with some embodiments of the present disclosure. Vehicle 101 includes a structure in accordance with the present disclosure. Arrangement 100 corresponds to a pre-event arrangement, wherein vehicle 101 is approaching vehicle 102 with a small overlap (e.g., designated as "L" in the figure). Arrangement 150 corresponds to an arrangement during the event, wherein the structure of vehicle 101 is reacting to loads from the collision, thus generating lateral displacement (e.g., along the "Y" axis). Arrangement 170 corresponds to an arrangement substantially after the event, wherein vehicle 101 is laterally offset from vehicle 102 (e.g., offset along the "Y" axis). It will be understood that while the description of FIG. 1 is in the context of the structure of vehicle 101, vehicle 102 may also have a similar structure to generate lateral loads (e.g., both vehicles 101 and 102 may include structure in accordance with the present disclosure).

Referencing arrangement 100, vehicle 101 and vehicle 102 may be approaching head-on, one vehicle may be stationary and the other approaching, or alternatively (not shown), vehicle 102 may be replaced by a substantially rigid barrier. In any of these scenarios, vehicle 101 is configured to transfer some of the kinetic energy along the "X" axis into kinetic energy along the "Y" axis, thus causing lateral displacement. A small overlap collision can cause significant damage to a vehicle, including intrusion into the passenger cabin. Without some lateral displacement, the full energy of impact is experienced by the vehicle. By deflecting the collision by imparting lateral displacement, vehicle 101 may undergo less damage, experience less energy dissipation, and expose the occupant compartment to less force or impact.

Referencing arrangement 150, the structure of vehicle 101 generates lateral forces that cause lateral displacement. Effectively, the lateral forces decrease the value of "L" as the event proceeds, thus moving vehicle 101 and vehicle 102 laterally away from each other.

Referencing arrangement 170, vehicle 101 has been displaced laterally a distance of "L" or even greater such that vehicle 101 and vehicle 102 do not overlap and thus can continue moving substantially past each other. By generating lateral forces, the structure of vehicle 101 causes vehicle 101 to move away from vehicle 102 along the "Y" axis.

Figure 2:
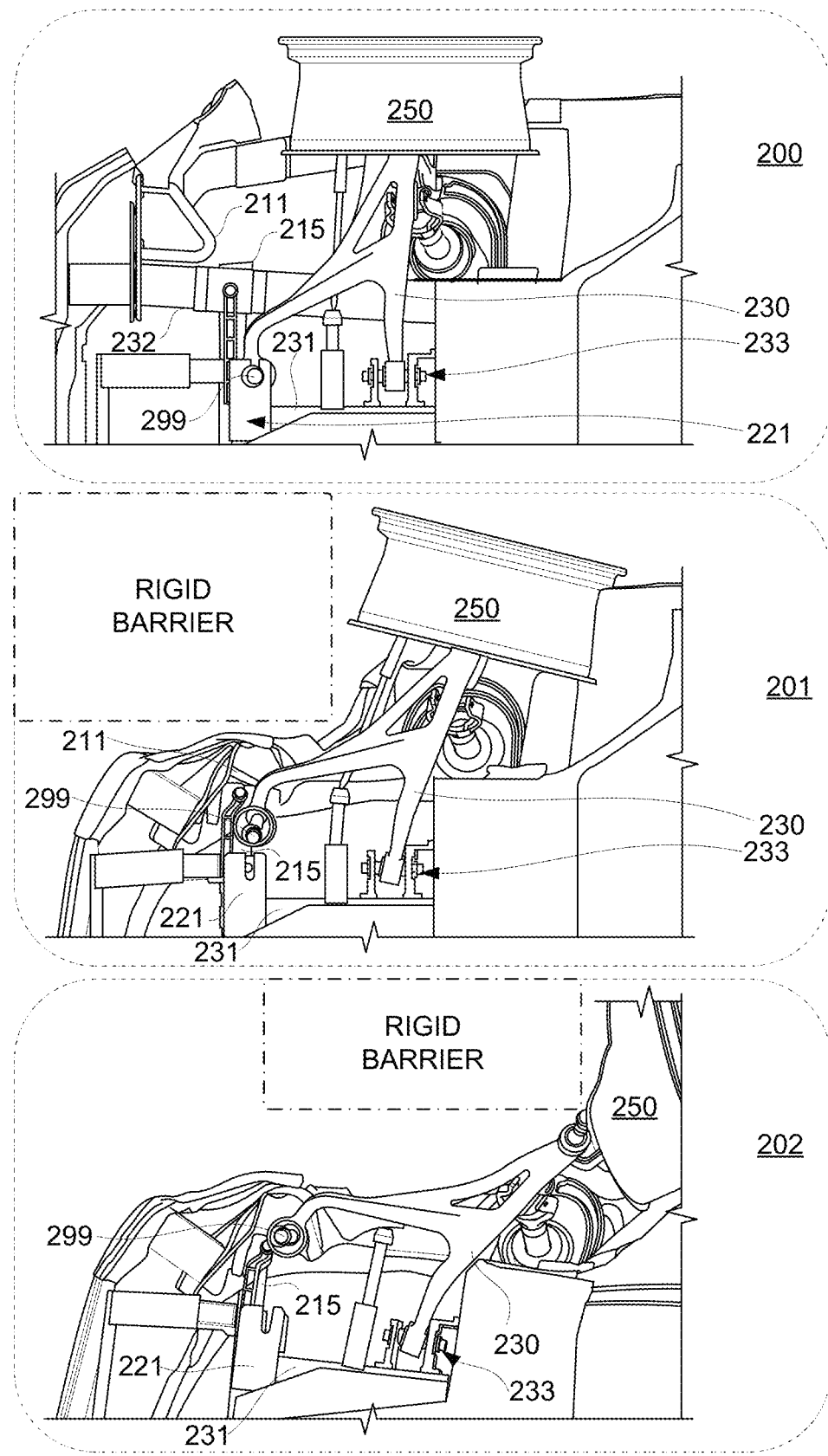
FIG. 2 shows several bottom views of an illustrative system for managing lateral loads during a small overlap collision and a system having a break-away region, in accordance with some embodiments of the present disclosure.

FIG. 2 shows several bottom views (e.g., panels 200, 201, and 202) of an illustrative system for managing lateral loads during a small overlap collision and a system having a break-away region, in accordance with some embodiments of the present disclosure. Panels 200, 201, and 202 illustrate bottom views of a corner of an illustrative vehicle undergoing a small overlap collision event.

As illustrated in FIG. 2, the vehicle includes element 211, which is configured to engage crossmember 215 during a small overlap collision. For example, element 211 may be referred to herein as a "wedge," and is configured to transmit force to cross member 215 to cause lateral displacement of the vehicle during the small overlap collision (e.g., as described in the context of FIGS. 3-4).

Lower control arm 230 is secured to mount 221, which includes a break-away region, by pin 299, and also to mount 233 (e.g., a rear mount). Mount 221, as illustrated includes a top section (e.g., the top of a C-shaped mount as illustrated) and a bottom section (e.g., the bottom of the C-shaped mount). Mount 221 couples control arm 230 to frame member 231. For example, as illustrated, pin 299 constrains lateral displacement of the front portion of control arm 230. In a further example, pin 299 and the end of lower control arm 230 may form a ball joint or other suitable joint for connecting control arm 230 to mount 221. In some embodiments, pin 299 may be considered part of mount 221 (e.g., a mount may include a bracket and joint structure). Mount 221 is rigidly affixed to frame member 231, and thus mount 221 is constrained from displacement relative to frame member 231.

Panel 200 corresponds to a pre-collision configuration. Panel 201 corresponds to a configuration during a small overlap collision. Panel 202 corresponds to a configuration during a small overlap collision at a later time than that illustrated in panel 201. Upon colliding with a rigid barrier (e.g., a structure, another vehicle, any other suitable rigid object having a suitable mass and stiffness) during a small overlap collision, element 211 is configured to be loaded by the barrier laterally into crossmember 215 thus imparting a lateral force on crossmember 215. The lateral force causes a lateral displacement such that the vehicle moves laterally away from the rigid barrier. Further, during the small overlap collision, as wheel 250 is loaded in the longitudinal direction (e.g., front to back), lower control arm 230 is loaded. Mount 221 is configured to break away during the collision, and thus stop constraining the front end of lower control arm 230. For example, pin 299 is configured to be loaded by lower control arm 230 and break-away from mount 221. After breaking away from mount 221, lower control arm 230 is constrained by rear mount 233, and it may pivot about rear mount 233. By breaking away from mount 221, the pivot point is shifted to rear mount 233, thus preventing wheel 250 from following a trajectory more directly into an occupant compartment (e.g., towards the center of the vehicle).

Although not shown in FIG. 2, in some embodiments, a deflector is included at the rear of the wheel well of wheel 250. For example, as illustrated in FIGS. 7-10, a deflector may be configured to further direct wheel 250 away from the occupant compartment to prevent intrusion. In a further example, a vehicle may include element 211 and crossmember 215, mount 221, and the deflector, on one or both sides of the vehicle, to mitigate intrusion during a small overlap collision.

Figure 3:
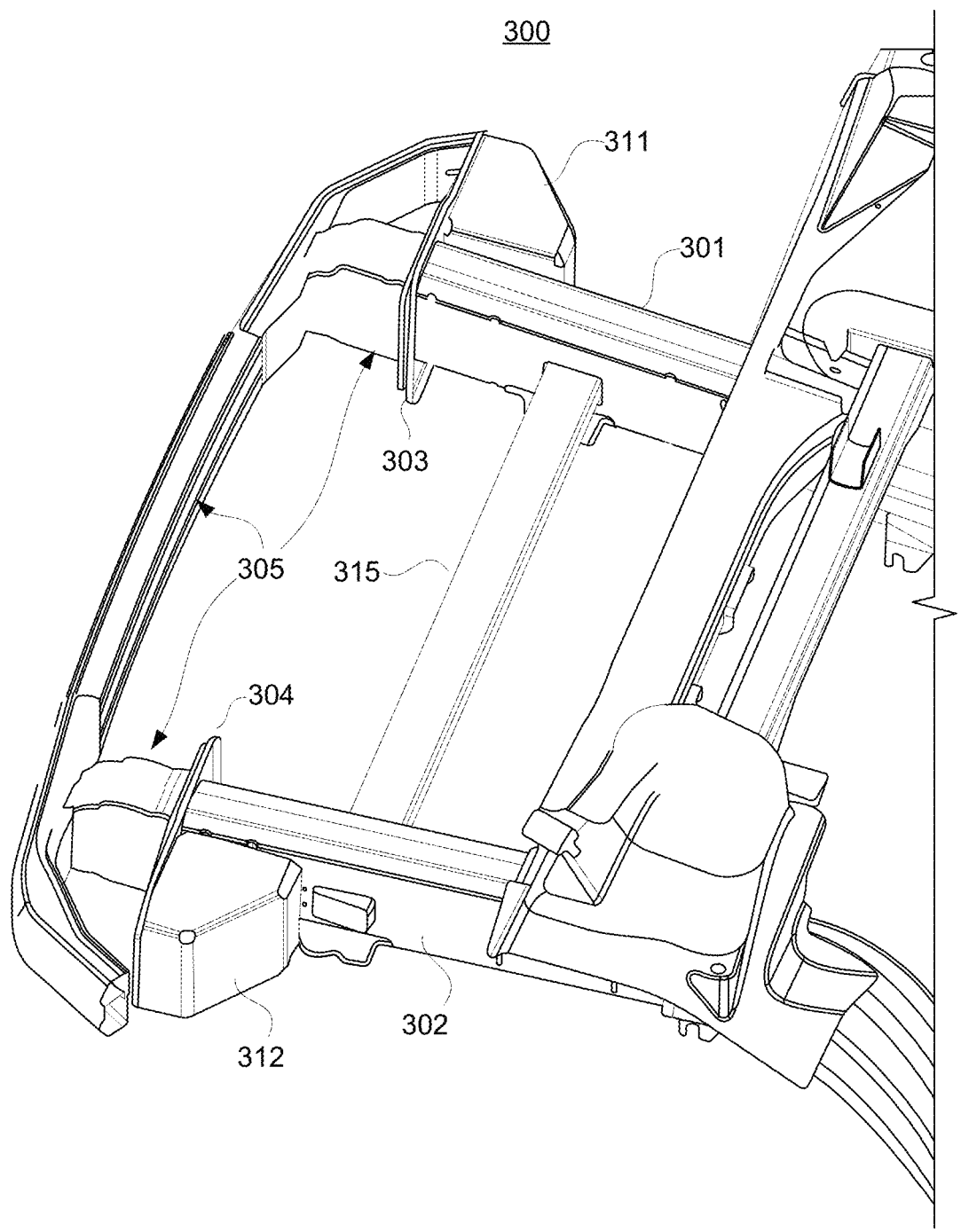
FIG. 3 shows a perspective view, from above, of an illustrative structure for managing lateral loads in a front crash, in accordance with some embodiments of the present disclosure.
Figure 4:
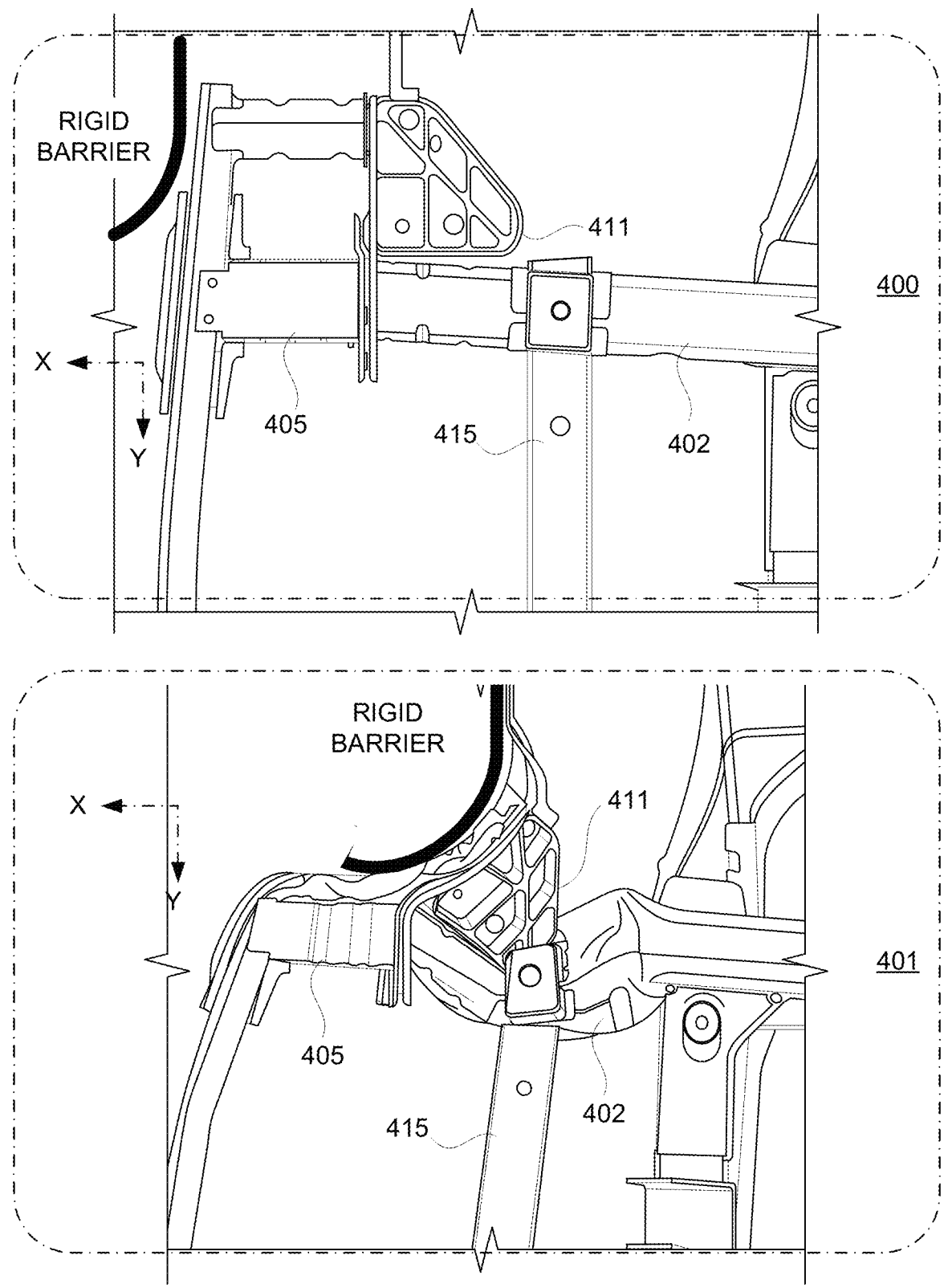
FIG. 4 shows two bottom views of an illustrative structure for managing lateral loads in a front crash, before and during an impact, in accordance with some embodiments of the present disclosure.

FIGS. 3-4 illustrate structures for managing loads in a front crash. For example, FIG. 3 illustrates an illustrative wedge and crossmember assembly that may correspond to panel 550 of FIG. 5 (e.g., a welded steel wedge). In a further example, FIG. 4 illustrates deformation of a wedge and crossmember assembly that may correspond to panel 500 of FIG. 5 (e.g., an extruded wedge). Any suitable structure (e.g., wedge an crossmember), having any suitable construction, may be used in accordance with the present disclosure.

FIG. 3 shows a perspective view, from above, of an illustrative structure for managing lateral loads in a front crash, in accordance with some embodiments of the present disclosure. For example, the structure of FIG. 3 may be included in vehicle 101 of FIG. 1 to generate lateral forces and displacement.

Vehicle portion 300 includes bumper assembly 305, plates 303 and 304, frame members 301 and 302, and a structure that includes wedges 311 and 312 and crossmember 315. Bumper system 305 interfaces to plates 303 and 304, which may be part of, or are otherwise affixed to, respective frame members 301 and 302. Frame members 301 and 302 extend substantially longitudinally along vehicle portion 300, although frame members 301 and 302 may exhibit some curvature or other non-linear shape. In an illustrative example, and as illustrated, frame members 301 and 302 may include tubing having a cross-sectional shape indicative of a rounded rectangle.

In some embodiments, each of wedges 311 and 312 includes a composition of three stamped pieces affixed together. For example, to illustrate, the wedge may include steel stampings of cold stamped dual-phase DP980 grade (e.g., having a yield strength of approximately 700 MPa and an ultimate tensile strength of approximately 1000 MPa) spot-welded to each other at multiple locations to form the wedge. In some embodiments, each of wedges 311 and 312 is connected to plates 303 and 304, respectively (e.g., Steel HSLA 500 plates) joining bumper system 305 and the front rail assembly (e.g., frame members 301 and 302 running longitudinally along the vehicle, front to back).

In an illustrative example, crossmember 315 extends between the front rails (e.g., frame members 301 and 302, as illustrated) which is secured (e.g., MIG welded, otherwise welded, or otherwise affixed) to both frame members 301 and 302. In some embodiments, for example, crossmember 315 may include martensite steel with the nomenclature MS 1500, a yield strength of approximately 1100 MPa, and an ultimate tensile strength of approximately 1500 MPa.

In an illustrative example, during the event of a 25% overlap crash on the same side of the vehicle as wedge 311, the bumper beam (of bumper system 305) rotates onto wedge 311 in order to provide the required moment to rotate wedge 311 and line up against crossmember 315. This allows the vehicle structure to provide a lateral push to the vehicle with sufficient lateral forces acting against it. In some embodiments, the middle reinforcement in wedge 311 lines up against crossmember 315 (e.g., in the center of crossmember 315 vertical-wise) so that the stack-up is near perfect in terms of a push along the "Y" axis. The middle reinforcement may include a horizontal plate (e.g., spot-welded to the lateral sides of wedge), a set of ribs and spines, any other suitable features, or any combination thereof. As illustrated, the ends of the crossmember are angled such that the front length of the crossmember is shorter than the rear length. For example, the side of crossmember 315 nearest bumper system 305 is shorter than the rear side. This tapering may improve, for example, engagement of either of wedges 311 or 312 with the respective end of crossmember 315 (e.g., prevent glancing contact).

Wedges 311 and 312 each include a first face arranged along a laterally outer edge of the respective frame member (e.g., of frame members 301 and 302) and a second face affixed to the respective bumper plate (e.g., of plates 303 and 304), which are arranged along bumper system 305 (e.g., bolted against bumper system 305). The first face and the second face are arranged at approximately 90° to each other, forming a wedge angle of approximately 90°. In an illustrative example, the wedge angle is configured to decrease when the wedge is loaded (e.g., the second face deflects towards the first face during the small overlap collision), thus elongating the wedge longitudinally via deformation, causing the wedge to engage with crossmember 315.

FIG. 4 shows two bottom views (e.g., panels 400 and 401) of an illustrative structure for managing lateral loads in a front crash, before and during an impact, in accordance with some embodiments of the present disclosure. Panel 400 shows a configuration just before a small overlap collision, and panel 401 shows a configuration during the small overlap collision. As illustrated in panels 400 and 401, the structure (e.g., which may be similar to the structure illustrated in FIG. 3) includes bumper assembly 405, frame member 402 (e.g., which interfaces to bumper assembly 405), element 411 (e.g., a "wedge"), and crossmember 415. Frame member 402 extends substantially longitudinally along the vehicle and may exhibit some curvature or other non-linear shape. The structure may allow for improved energy absorption in an event of crash and an initial lateral push of the vehicle in the "Y" direction. To illustrate, the rigid barrier (e.g., a building, vehicle, or other substantially rigid barrier) impacts the vehicle, and bumper system 405 loads frame member 402 and element 411. During the collision event, element 411, which may deform under loading, engages and applies lateral force to cross member 415 in the "Y" direction. The lateral force causes the vehicle to move in the "Y" direction, away from the rigid barrier. Element 411 is illustrated and annotated in further detail in FIG. 5.

Figure 5:
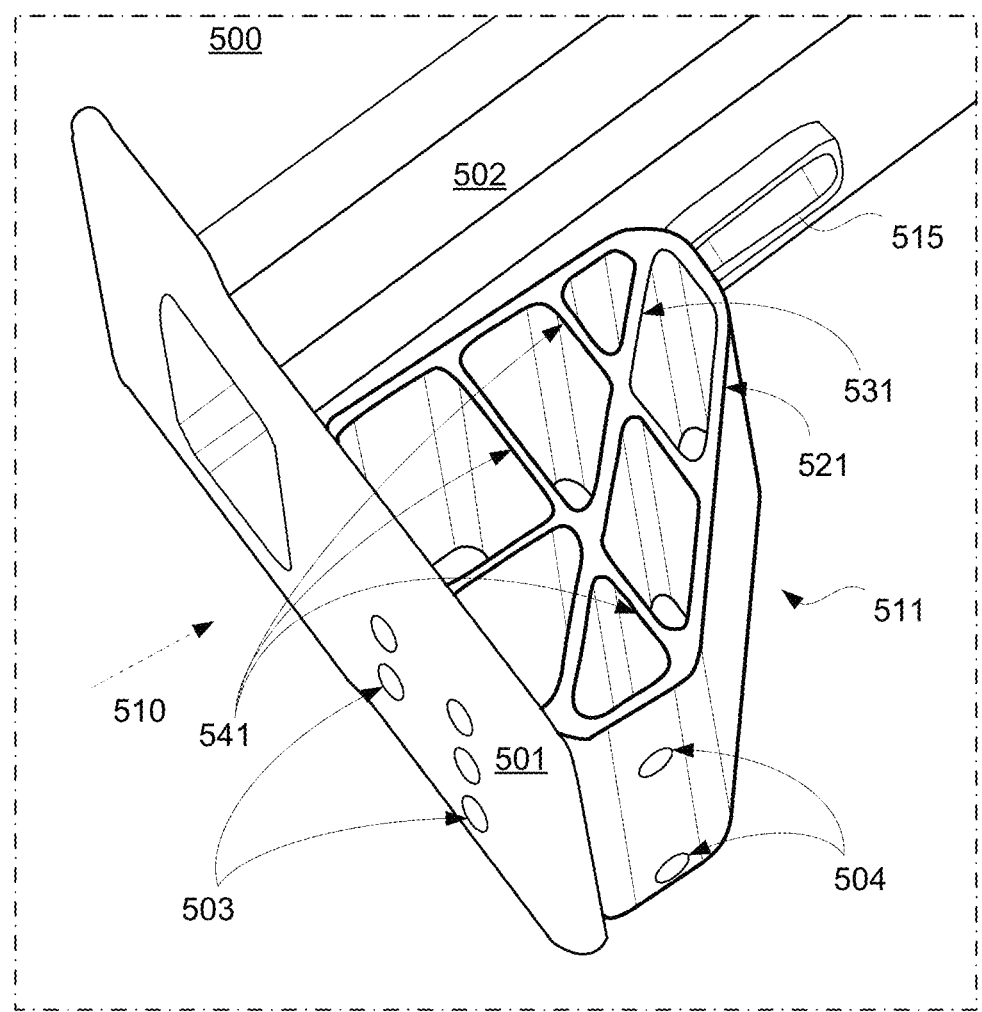
FIG. 5 shows illustrative structures for managing lateral loads in a front crash, in accordance with some embodiments of the present disclosure.
Figure 5:
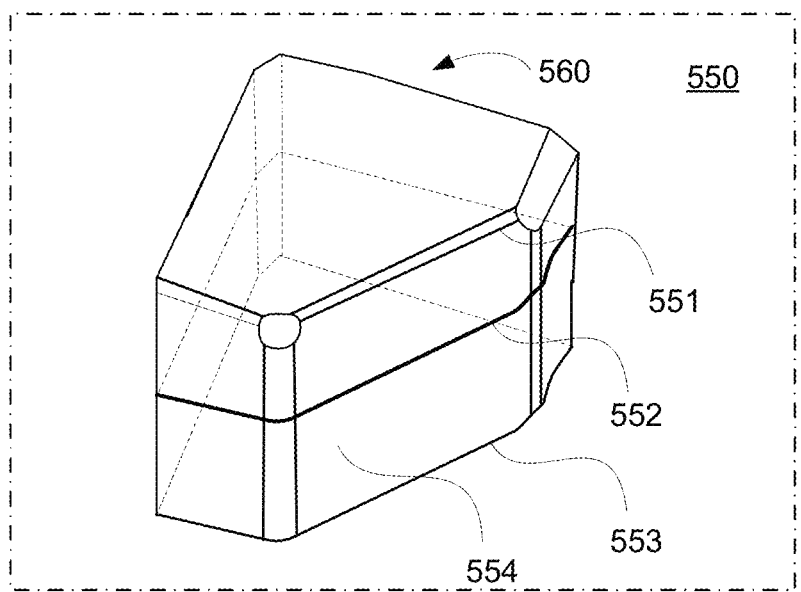

FIG. 5 shows illustrative structures for managing lateral loads in a front crash, in accordance with some embodiments of the present disclosure. Panel 500 shows a configuration, without deformation, of illustrative element 511 (e.g., a "wedge"), frame member 502, bumper interface 501, and cross-member 515. Spines 521 and 531 of element 511 are configured and arranged to, upon loading in direction 510 during a small overlap collision, align with the forward and rear edges of the near end of crossmember 515, thus imparting lateral loading on the end of crossmember 515 (e.g., to cause lateral displacement). Because spines 521 and 531 are relatively stiff (e.g., further stiffened by ribs 541, of which several are indicated in panel 500), they are able to impart load onto crossmember 515 rather than deforming significantly themselves. In an illustrative example, element 511 may be formed by extruding aluminum (e.g., and any suitable subsequent processing or machining). For example, a single length of extruded aluminum having a profile as shown on the top of element 511 can be cut into multiple wedges that can be used on both lateral sides of the vehicle. Using an extrusion technique provides a low cost and simple process for manufacturing the wedges. In addition, using extruded aluminum provides a weight savings compared to a wedge made out of steel. In a further illustrative example, element 511 may be secured to bumper interface 501 (e.g., using fasteners, bonding, mechanical locking, or any other suitable technique). In a further illustrative example, element 511 is not secured to frame member 502 to allow avoid longitudinal constraint of element 511 by frame member 502 (e.g., which might impact alignment of spines 521 and 531 with the end of crossmember 515). In some embodiments, a top plate, a bottom plate, or both may be affixed to (e.g., welded to or otherwise fastened to) element 511 (e.g., or a top of a sidewall, spine, and/or ribs thereof). For example, the top plate or bottom plate may include features for securing to body elements (e.g., a hood support, fender bracket, or other component).

Fasteners 503 secure element 511 to bumper interface 501, and may include, for example, threaded nuts and bolts, threaded studs and nuts, screws, rivets, mechanical interlocks, welds, any other suitable affixment, or any combination thereof. Features 504 are configured to affix other components (e.g., a fender bracket or other body element). In some embodiments, element 511 includes a plurality of holes arranged in wall adjacent bumper interface 501 for coupling element 511 to bumper interface 501 of the vehicle. In some embodiments, the wall of element 511 arranged along frame element 502 and does not include holes for affixing to the frame element 502.

Element 511 is configured for generating side loads in a vehicle during a small-offset collision and is configured to be arranged laterally outside of a longitudinal frame element of the vehicle. In some embodiments, element 511 includes a sidewall (e.g., forming a wedge-shaped structure). The sidewall includes a first wall longitudinally oriented (e.g., along frame member 502), a second wall laterally oriented (e.g., along bumper interface 501), and a first spine (e.g., spine 521) angled to connect the first wall and the second wall. The structure also includes a second spine (e.g., spine 531) substantially parallel to the first spine, arranged inside of the sidewall. The structure also includes a plurality of ribs (e.g., ribs 541) connecting the first spine and the second spine, connecting the second spine to the first wall and the second wall, or both. The structure is configured to deform when a load is applied to the second wall such that the first spine and the second spine align with an end of the crossmember to impart a lateral force on the crossmember. For example, in some embodiments, a profile of the sidewall, the second spine, and the plurality of ribs is made from extruded aluminum. Element 511, as illustrated, is configured to define when the load is applied to the wall adjacent bumper interface 501 such that spines 521 and 531 are configured to align with respective walls of crossmember 515.

In some embodiments, spine 521 meets the wall of element 511 adjacent frame member 502 at a curved interface. In some embodiments, spine 521 meets the wall of element 511 adjacent bumper interface 501 at a curved interface. For example, element 511 may be substantially wedge shaped and include curved or segmented regions where walls meet. In a further example, in some embodiments, element 511 includes third wall longitudinally oriented to connect spine 521 and the wall of element 511 adjacent bumper interface 501.

In some embodiments, spines 521 and 531 have stiffnesses sufficient to transfer load to crossmember 515. Ribs 541 have stiffnesses to substantially maintain a distance between spines 521 and 531, maintain alignment of spines 521 and 531 with crossmember 515 during the small offset collision, or both.

In some embodiments, element 511 is formed by extruding aluminum along an axis, and then cutting the extrusion to form the structure. A billet is extruded along the axis to form a first extrusion having a first length and a cross-section. The cross-section (e.g., the profile) includes a sidewall having a first wall longitudinally oriented (e.g., configured to be arranged along frame member 502), a second wall laterally oriented (e.g., configured to be arranged along bumper interface 501), and a first spine (e.g., spine 521) angled to connect the first wall and the second wall. The cross-section also includes a second spine (e.g., spine 531) and a plurality of ribs (e.g., ribs 541). The second spine is substantially parallel to the first spine and arranged inside of the sidewall. The plurality of ribs connect the first spine and the second spine, connect the second spine to the first wall and the second wall, or both. The structure is configured to deform when a load is applied to the second wall such that the first spine and the second spine align with an end of a crossmember (e.g., crossmember 515) to impart a lateral force on the crossmember. The method includes cutting the extrusion at a first position along the axis, and then cutting the extrusion at a second position along the axis a predetermined length from the first position to form the structure. For example, the predetermined length defines the height of the structure when installed in a vehicle (e.g., from top to bottom, as illustrated). In some embodiments, the technique includes forming a plurality of through features in the second wall for securing the structure to a vehicle (e.g., to accommodate fasteners 503). For example, the through features may include drilled holes or slots, machined holes or slots, any other suitable opening, or any combination thereof. In some embodiments, the method includes welding or otherwise securing (e.g., fastening) a top plate to a top side of the structure (not shown), a bottom plate to a bottom side of the structure (not shown), or both. For example, the top side and the bottom side are separated by the predetermined length.

Panel 550 shows element 560 made of sheet metal. Element 560 includes top sheet 551, middle sheet 552, and bottom sheet 553, with lateral sheet 554 extending around the sides of element 560. For example, to contrast, element 560 does not include a rib-spine structure such as element 511 of panel 500. In some embodiments, element 560 is made of steel sheet, cut and/or bent to a suitable shape and secured (e.g., spot welded). Middle sheet 552 provides stiffness to transfer to load to an end of a crossmember without undergoing significant deformation (e.g., element 560 is sufficiently stiff to impart a lateral load onto an end of the crossmember).

In some embodiments, the present disclosure is directed to a structure (e.g., element 560) that includes a sidewall (e.g., forming a wedge-shaped structure) including a first wall longitudinally oriented, a second wall laterally oriented, and a third wall angled to connect the first wall and the second wall. The structure includes a top plate (e.g., top sheet 551) arranged on top of and affixed to the sidewall, a bottom plate (e.g., bottom sheet 553) arranged below and affixed to the sidewall, and an intermediate plate (e.g., middle sheet 552) arranged between the top plate and the bottom plate. The structure is configured to deform when a load is applied to the second wall such that the intermediate plate aligns with an end of the crossmember to impart a lateral force on the crossmember. For example, in some embodiments, the sidewall, the top plate, the bottom plate, and the intermediate plate are made of sheet steel. In a further example, the sidewall, the top plate, the bottom plate, and the intermediate plate are spot welded to form the structure. In some embodiments, the intermediate plate (e.g., middle sheet 552) has a stiffness sufficient to transfer load to the crossmember.

In some embodiments, element 560 is formed by stamping, pressing, laser-cutting, plasma-cutting, water-jet cutting, or otherwise cutting sheet steel to form one or more cutouts. The one or more cutouts are folded, bent, or otherwise formed to generate a structure, and the one or more cutouts are welded at one or more locations to secure the structure.

Figure 6:
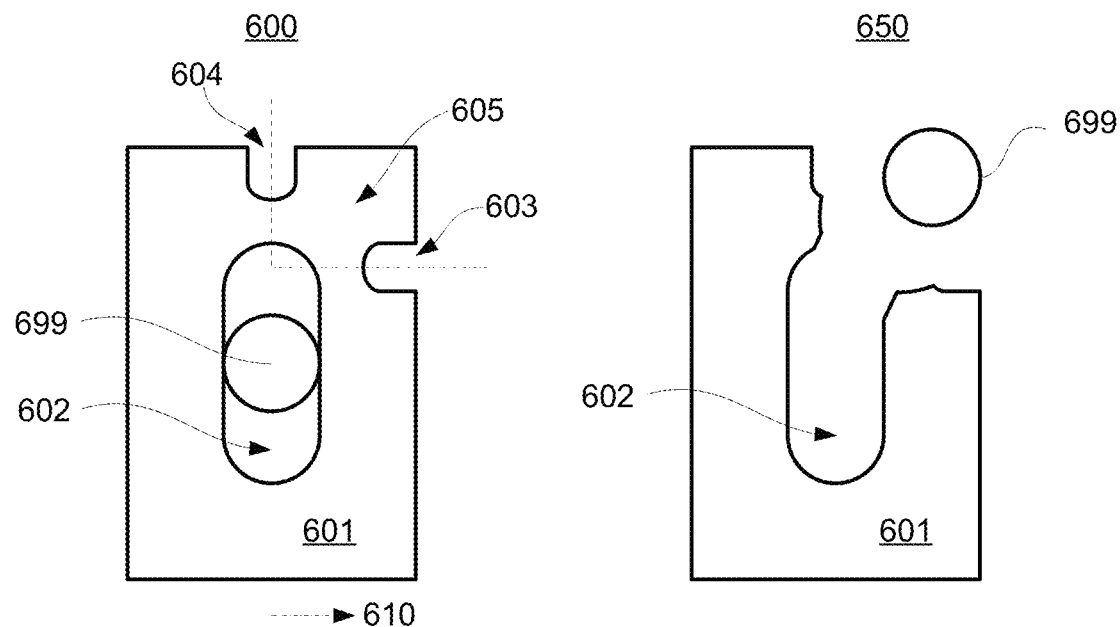
FIG. 6 shows a top view of an illustrative mount having a break-away region, before and after failure of the break-away region, in accordance with some embodiments of the present disclosure.
Figure 7:
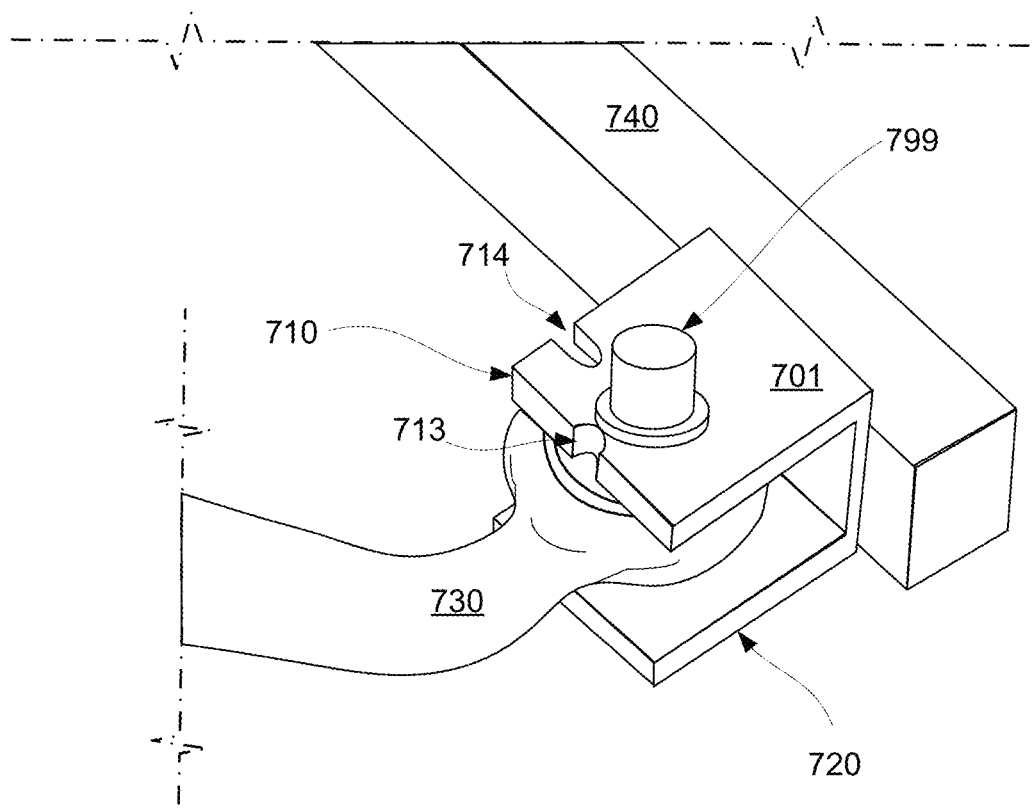
FIG. 7 shows a perspective view of an illustrative system including part of a lower control arm, and a mount having a break-away region, in accordance with some embodiments of the present disclosure.

As shown in FIGS. 1-5, a lateral load may be imparted to a vehicle to reduce intrusion into an occupant compartment. During the collision event, the wheel may be loaded rearward, and thus may approach an occupant compartment. In some embodiments, the present disclosure is directed to systems and structures for managing the kinematics of the wheel to direct the wheel away from the occupant compartment as least partially. FIGS. 6-7 illustrate a control arm mount configured to break-away to manage kinematics of the wheel.

FIG. 6 shows a top view of illustrative mount 601 having break-away region 605, before (e.g., arrangement 600) and after (e.g., arrangement 650) failure of break-away region 605, in accordance with some embodiments of the present disclosure. Mount 601 (e.g., which may be similar to mount 221 of FIG. 2) includes through feature 602 (e.g., a slot as illustrated, although any suitable through feature may be included), and break-away region 605 (e.g., defined at least in part by notch 604 and notch 603, as illustrated). As illustrated, pin 699, which is coupled to a lower control arm, is arranged in through feature 602. For example, in arrangement 600 (e.g., a pre-collision arrangement), pin 699 is constrained to lateral displacement within through feature 602 (e.g., pin 699 can move within the slot under loading). Notches 603 and 604 introduce relatively weakened regions (e.g., the regions between each notch and through feature 602) in terms of tensile strength as compared to a mount not having the notches. For example, notch 603, notch 604, and through feature 602 define break-away region 605.

Break-away region 605 exhibits a reduced tensile strength at its boundary and is configured to fail under a collision event to allow pin 699 to move laterally out of through feature 602, as illustrated in arrangement 650. In some embodiments, break-away region 605 is configured to fail and release pin 699 during the collision event by fracturing. In some embodiments, break-away region 605 is configured to fail and release pin 699 during the collision event by plastically deforming and opening through feature 602 to a boundary of mount 601. In an illustrative example, referencing arrangement 600, pin 699 may be loaded by a force in direction 610 (e.g., or other suitable direction). Pin 699 transmits the load to mount 610, and the resultant load causes break-away region 605 to fail, as illustrated in arrangement 650. In arrangement 650, for example, pin 699 is no longer constrained laterally by through feature 602. In an illustrative example, break-away region 605 may be configured to fail under a loading of 100 kN, 150 kN, or any other suitable loading in accordance with the present disclosure. It will be understood that notch 603 and 604 may include any suitable cross-sectional shape, having any suitable geometric properties, to define a break-away region of a mount, in accordance with the present disclosure.

FIG. 7 shows a perspective view of an illustrative system including part of lower control arm 730 (e.g., which may be the same as or similar to lower control arm 230 of FIG. 2), and mount 701 (e.g., which may be similar to mount 221 of FIG. 2) having a break-away region (e.g., defined by through feature 713 and 714), in accordance with some embodiments of the present disclosure. Mount 701, as illustrated includes a top section (e.g., section 710, which is the top of a C-shaped mount as illustrated) and a bottom section (e.g., section 720, which is the bottom of a C-shaped mount as illustrated). In some embodiments (not illustrated in FIG. 7), the top and bottom sections may be separate components such as separate plates (e.g., rather than plates/sections of a C-shaped structure). Mount 701 couples control arm 730 to frame member 740. For example, as illustrated, pin 799 constrains lateral displacement of the front portion of control arm 730. In a further example, pin 799 and the end of lower control arm 730 may form a ball joint or other suitable joint for connecting control arm 730 to mount 701. In some embodiments, pin 799 may be considered part of mount 701 (e.g., a mount may include a bracket and joint structure). Mount 701 is rigidly affixed to frame member 740, and thus mount 701 is constrained from displacement relative to frame member 740.

Section 710 includes a though feature that is configured to accommodate pin 799 and constrain lateral displacement of pin 799 during normal operation. Section 710 also includes features 713 and 714, illustrated as notches in FIG. 7, which define a break-away region (e.g., similar to break-away region 605 of FIG. 6). The break-away region exhibits a reduced tensile strength at its boundary and is configured to fail under a collision event to allow pin 799 to move laterally out of the through feature of section 710. Section 720 also includes a through feature (not visible in FIG. 7) that is configured to accommodate pin 799 and constrain lateral displacement of pin 799 during normal operation. Section 720 also includes features for defining a break-away region (e.g., similar to the break-away region of section 710), but the features are not visible in FIG. 7 (e.g., hidden by control arm 730).

In an illustrative example, a system for managing wheel kinematics during a collision event may include a recess arranged in a frame member, a pin arranged vertically in the recess, a top plate, and a bottom plate. The pin (e.g., pin 799) may be configured to couple a lower control arm (e.g., lower control arm 730) to the frame member and constrain vertical displacement of the lower control arm relative to the frame member. For example, the frame member may include one or more beams, mounts, any other suitable structural components, or any combination thereof (e.g., frame member 740 and mount 701 may be combined and referred to as a frame member). The top plate, the bottom plate, or both may include respective through features configured to accommodate the pin and constrain lateral motion of the pin. Further, the top plate, the bottom plate, or both may include a respective break-away region having a reduced stiffness configured to fail under the collision event to allow the pin to move laterally out of the through feature.

As illustrated, features 713 and 714 are notches. Any suitable through or recess feature may be included to define a break-away region of section 710, section 720, or both. For example, features include blind or through holes, blind or through slots, blind or through notches, and other suitable blind or through features, or any combination thereof that define a break-away region. To illustrate, the break-away region is configured to fail (e.g., plasticly deform, fracture, or otherwise fail) during a small overlap collision (e.g., under loading experienced during the collision). To further illustrate, in some embodiments, the break-away region is configured to fail under a load of 100 kN (or any other suitable threshold).

In an illustrative example, a lower control arm (e.g., lower control arm 230 of FIG. 2, or lower control arm 730 of FIG. 7) or "A-arm" may be designed to pull out of a mount at about 40 ms into the collision event such that the wheel follows a trajectory based on kinematics. For example, other joints (e.g., rear mount 233 of FIG. 2, a lower control arm-to-knuckle joint, an upper control arm-to-knuckle joint, a tie-rod-to-knuckle joint, any other suitable joint, or any combination thereof) may be included to couple lower control arm 230 to the frame member and govern the kinematics after pull out.

In some embodiments, a lower control arm (e.g., lower control arm 230 of FIG. 2, lower control arm 730 of FIG. 7) may be constructed of an aluminum material (e.g., forged aluminum 6110 T6). The lower control arm may be configured to pull out of a subframe clevis (e.g., of mount 221 of FIG. 2, mount 601 of FIG. 6, or mount 701 of FIG. 7). For example, the mount may be constructed of aluminum (e.g., 6008 T79 grade aluminum), and may be configured to fracture at about 40 ms into the collision event (e.g., with suitable strain values). In an illustrative example, the clevis (e.g., which includes the features defining the break-away region) may include a 3 mm slot, both at the top and bottom. When loaded by the collision event in tension with 150 kN of force in the cross-car direction, the clevis fractures the slot constraining the pin to pull the lower control arm out of the slot, thus assisting kinematics of the wheel. To further illustrate, the clevis (e.g., mount 221 of FIG. 2, mount 601 of FIG. 6, or mount 701 of FIG. 7) may be MIG-welded to the rest of an aluminum 6008 T79 subframe. In some embodiments, the lower control arm is secured against the subframe clevis by a fastener, optionally with a preload. For example, the lower control arm may be secured against the subframe clevis with an M16 bolt, under a preload of 80 kN, with a bushing arranged around the bolt to improve, maintain, or otherwise impact vehicle suspension performance. To illustrate, the subframe clevis may be configured to exhibit material fracture in order to release the pin and release the lower control arm at a suitable loading under collision (e.g., at 150 kN of crash loads in the lateral direction).

To illustrate, the break-away region allows management of wheel kinematics to avoid the wheel stacking up against a hinge pillar and rocker of the vehicle. The reduction in loading against the hinge pillar provides for reduced intrusion into the occupant compartment, the battery pack structure (e.g., of an electric vehicle), or both. For example, referencing FIG. 2, if lower control arm 230 rotated about pin 299 (e.g., did not break-away), wheel 250 would be directed inward. By breaking away, lower control arm 230 causes wheel 250 to take a path that stays further outside (laterally) than a path wheel 250 would take if lower control arm 230 did not break-away.

As shown in FIGS. 1-5, a lateral load may be imparted to a vehicle to reduce intrusion into an occupant compartment. During the collision event, the wheel may be loaded rearward, and thus may approach an occupant compartment. As shown in FIGS. 6-7, in some embodiments, the present disclosure is directed to systems and structures for managing the kinematics of the wheel to direct the wheel away from the occupant compartment as least partially. FIGS. 8-11 illustrate a deflector configured to further manage kinematics of the wheel by deflecting it away from the occupant compartment.

Figure 8:
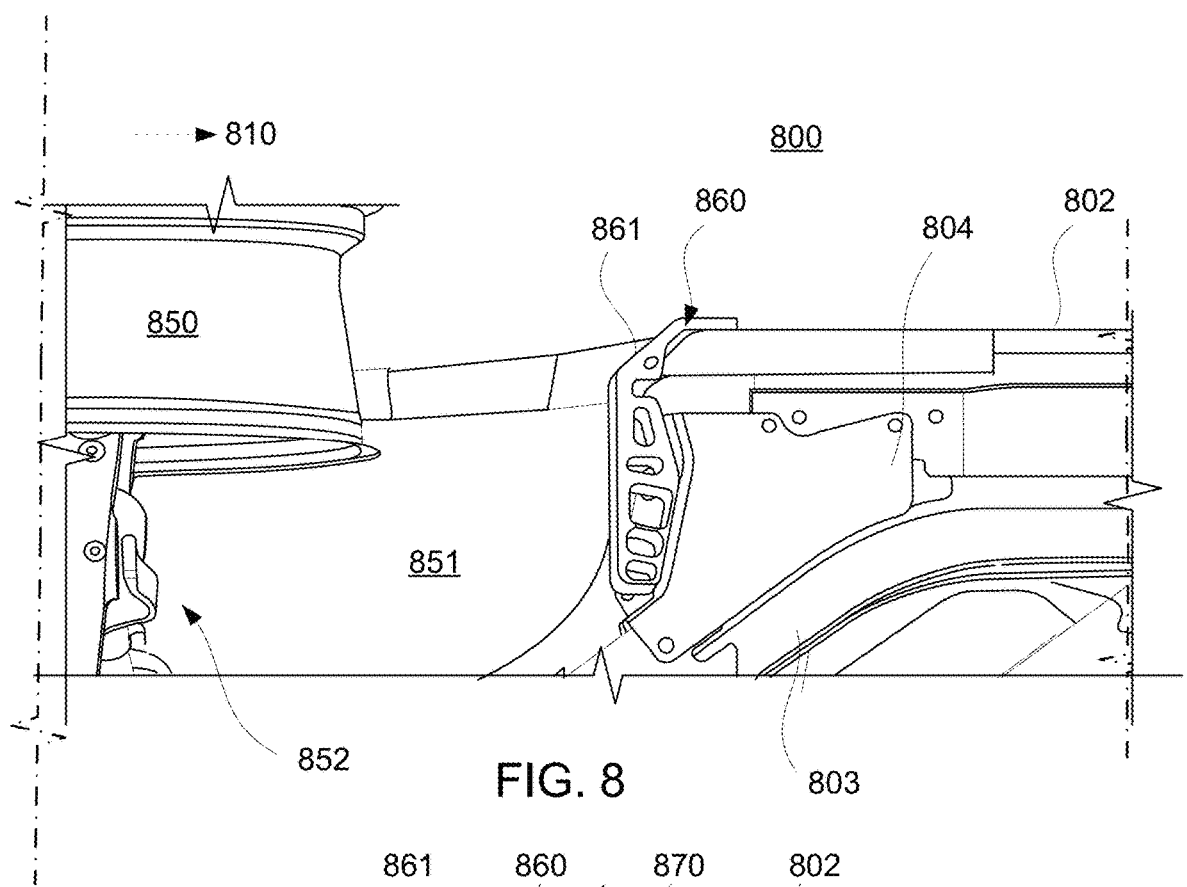
FIG. 8 shows a bottom view of a portion of an illustrative vehicle having a wheel deflector, in accordance with some embodiments of the present disclosure.
Figure 9:
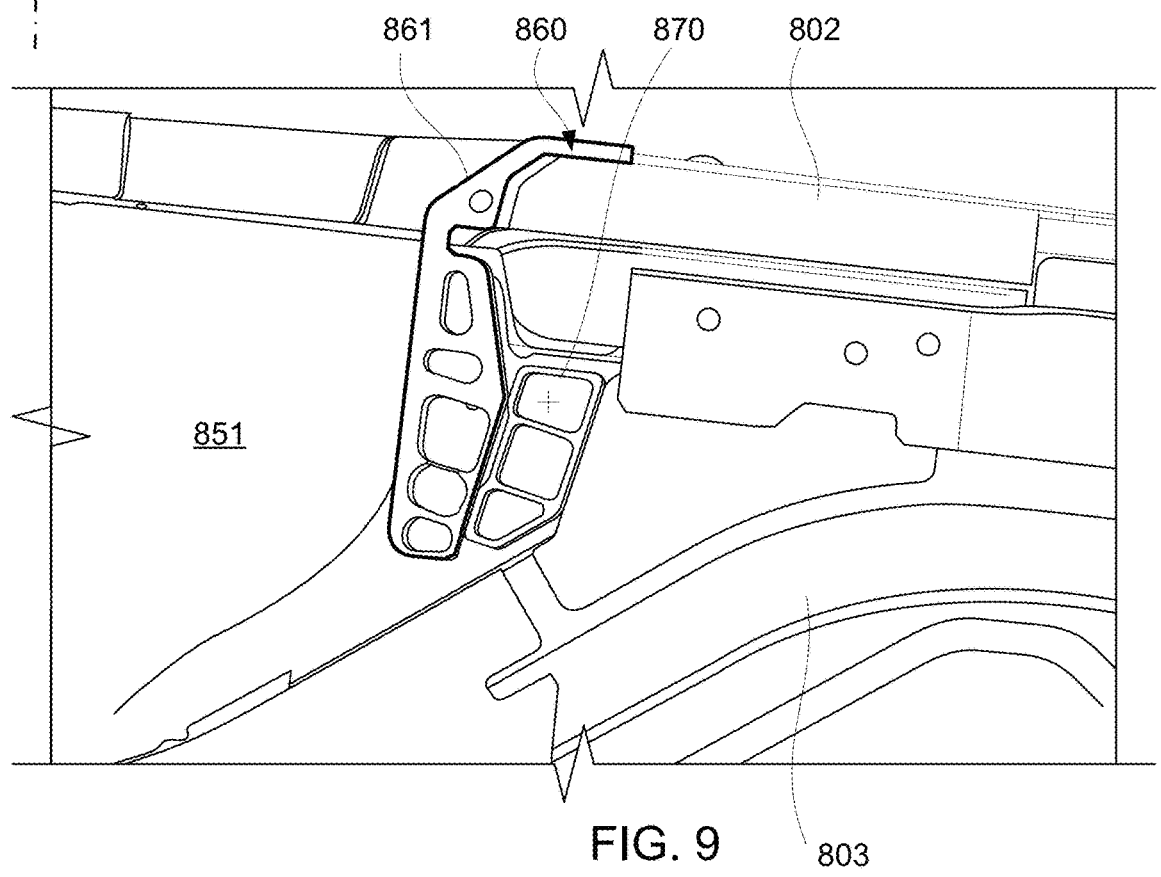
FIG. 9 shows a bottom view of a portion of the illustrative vehicle of FIG. 8 with the frame coupling removed, in accordance with some embodiments of the present disclosure.
Figure 10:
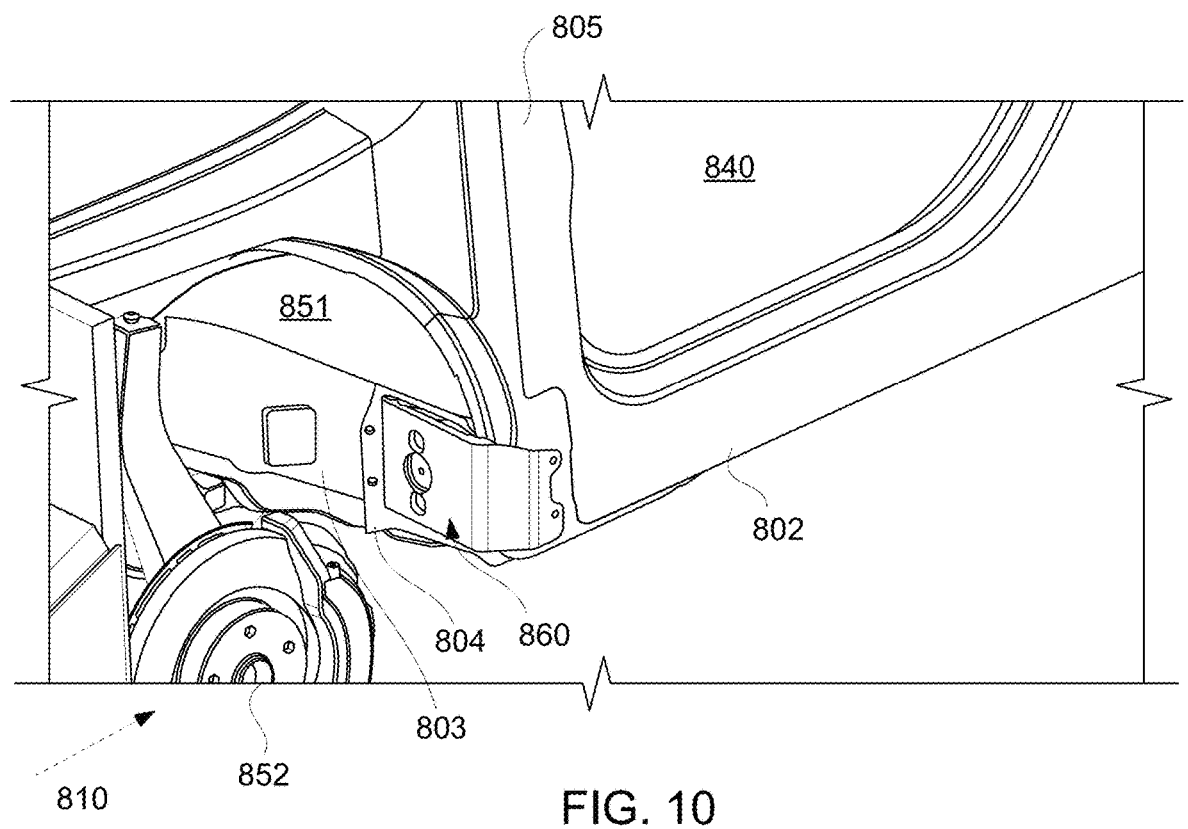
FIG. 10 shows a perspective view of a portion of the illustrative vehicle of FIG. 8, with the wheel removed, in accordance with some embodiments of the present disclosure.

FIG. 8 shows a bottom view of a portion of illustrative vehicle 800 having wheel deflector 860, in accordance with some embodiments of the present disclosure. FIG. 9 shows a bottom view of a portion of illustrative vehicle 800 of FIG. 8 with frame coupling 804 removed, in accordance with some embodiments of the present disclosure. FIG. 10 shows a perspective view of a portion of illustrative vehicle 800 of FIG. 8, with wheel 850 removed, in accordance with some embodiments of the present disclosure. Vehicle 800 includes wheel 850 affixed to mounting system 852, wheel well 851, body system 802, frame system 803, frame coupling 804, and deflector 860. For example, mounting system 852 may include a spindle, control arms, suspension components, braking components, steering components, structural components, any other suitable components, or any suitable combination thereof. In a further example, wheel 850 and at least some of mounting system 852 are arranged in wheel well 851. In a further example, body system 802 may include an occupant compartment. In a further example, frame system 803 may include a structural frame and a battery system, suspension system, steering system, electrical system, any other suitable system, or any suitable combination thereof.

During a small offset collision event, wheel 850 may be loaded in direction 810 (e.g., as illustrated in FIGS. 8 and 10). As wheel 850 is displaced relative to wheel well 851 during a collision event, wheel 850 approaches deflector 860. Deflector 860 is configured to absorb some energy from wheel 850 (e.g., by plastically deforming). For example, the structure of deflector 801 may be designed with ribs and hollow portions (e.g., to result in a stiffness) to buckle or deform under loading. Further, section 861 (e.g., an angled portion) of deflector 860 is configured to cause wheel 850 to deflect away from frame system 803, an occupant compartment of body system 802, or both.

Referencing FIG. 9, wherein frame coupling 804 is removed, absorber 870 is shown arranged between deflector 860 and frame system 803. Absorber 870 is arranged behind frame coupler 804, as illustrated, and configured to further absorb energy from deflector 860 that arises from wheel 850. In some embodiments, absorber 870 need not be included or may otherwise be included as part of deflector 860. Components such as wheel 850 that may impact deflector 860 may have sufficient energy to otherwise intrude into the occupant compartment of body system 802 if (i) that energy is not partially absorbed by deflector 860, absorber 870, or both, or if (ii) the component is not otherwise deflected away from frame system 803, body system 802, or both. In an illustrative example, absorber 870 is arranged behind section 862 and is configured to further absorb energy from the collision event by plastically deforming.

Referencing FIG. 10, wherein wheel 850 is removed, hinge pillar 805 of body system 802 is shown more clearly. Further, occupant compartment 840 is illustrated in FIG. 10 (e.g., occupant compartment 840 is not visible in FIGS. 8-9, both of which include bottom views). Mounting system 852 remains in place in FIG. 10 (e.g., and includes a rotor, caliper assembly, spindle, suspension arms, etc.).

Figure 11:
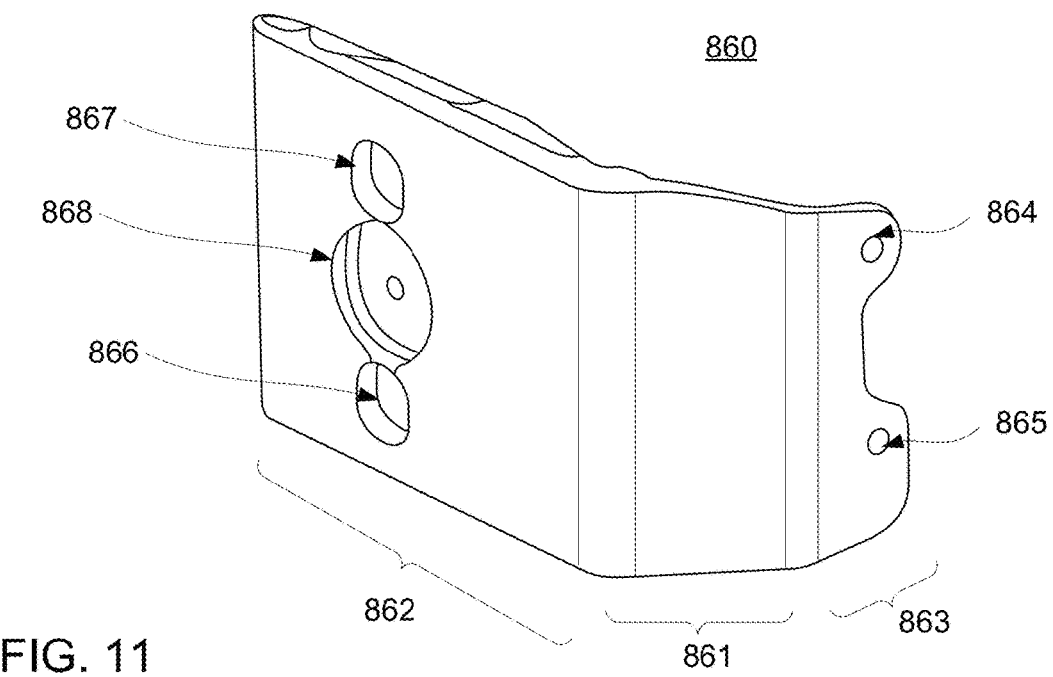
FIG. 11 shows a perspective view of the deflector of FIG. 8, in accordance with some embodiments of the present disclosure.

FIG. 11 shows a perspective view of deflector 860 of FIG. 8, in accordance with some embodiments of the present disclosure. Deflector 860 includes holes 864 and 865 for mounting to body system 802 or a member thereof, holes 866 and 867 for accessing mounting holes (not visible in FIG. 6) for mounting deflector 860 to frame coupler 804, feature 868 (e.g., for attaching a wheel well liner or inner fender), section 861, section 862, and section 863. In some embodiments, for example, deflector 860 is an aluminum extrusion (e.g., with at least some recess features and through features machined after extrusion).

In some embodiments, deflector 860 is configured to allow spokes or other features of wheel 850 to move away from occupant compartment 840 such that wheel 850 does not get caught up between the barrier and occupant compartment 840, which might cause large intrusions in the footrest and toe-pan region.

In some embodiments, deflector 860, absorber 870, and frame coupler 804 form a system for deflecting wheel 850. In some such embodiments, the system is affixed to four structures: a portion of wheel well 851, frame member 803, a portion of body system 802, and hinge pillar 805. In an illustrative example, deflector 860, absorber 870, or both may be constructed of (e.g., extruded from) aluminum. To further illustrate, deflector 860, absorber 870, or both may be constructed of aluminum of grade 6008 T74 temper with a yield strength of 275 MPa, an ultimate tensile strength of 320 MPa, and a total elongation of 12%. In some embodiments, for example, frame coupler 804 is configured (e.g., hot stamped) to achieve a Yield strength of 1000 MPa and an Ultimate tensile strength of 1500 MPa with total elongation of about 7% (e.g., frame coupler 804 may be a steel-press-hardened stamping). To illustrate, deflector 860 and absorber 870 may be extrusions of multiple thicknesses ranging from 2.5 mm to 6.5 mm, while frame coupler 804 may include a steel stamped part (e.g., having a thickness of 2.4 mm or any other suitable thickness).

In an illustrative example, deflector 860 is arranged between wheel well 851 and hinge pillar 805, and is capable of transferring up to 500 kN loads in a crash event to hinge pillar 805 and frame coupling 804, body system 802, and frame system 803 so that intrusion into occupant compartment 840 may be mitigated.

Deflector 860 includes tapered surface (e.g., section 861) for engaging the wheel spokes and pushing them away from occupant compartment 840 during a small overlap offset crash. For example, in the context of an electric vehicle, a battery pack may be arranged underneath the floor of the vehicle (e.g., below occupant compartment 840). Deflector 860, absorber 870, and frame coupler 804 enable wheel 850 to move away from the battery pack in the event of a small overlap crash. Further, deflector 860, absorber 870, and frame coupler 804 protect flanges or other features of hinge pillar 805 (e.g., where the spot welds may be prone to fracture). In some embodiments, deflector 860, absorber 870, and frame coupler 804 cause kinematics that prevent wheel 850 from stacking up against hinge pillar 805 and a rocker of body system 802 thus allowing for lessened intrusion into occupant compartment 840, a battery pack structure, or both.

In some embodiments, deflector 860 includes section 862 arranged at an inside wall of wheel well 851 and substantially facing wheel 850. Section 862 includes, for example, a hollow structure configured to absorb energy from the collision event by plastically deforming. In some embodiments, deflector 260 includes section 861 arranged at an angle to wheel 850 (e.g., and section 862) and configured to deflect wheel 850 laterally outwards from the vehicle to prevent intrusion of the wheel into occupant compartment 840 during the collision event.

In an illustrative example, deflector 860 includes a set of through features (e.g., holes 864 and 865) configured to accommodate a corresponding set of fasteners affixed to the hinge-pillar. In some embodiments, deflector 860 includes a set of through features (e.g., holes 866 and 867) configured to accommodate a corresponding set of fasteners affixed to a rear of wheel well 851.

In an illustrative example, frame coupler 804 is arranged behind section 862 and is configured to affix a frame system (e.g., frame member 803) and body system 802, which forms occupant compartment 840. Absorber 870 may be arranged behind frame coupler 804 and may be configured to further absorb energy from the collision event by plastically deforming.

In an illustrative example, wheel 850 may include a plurality of radial spokes, and deflector 860 may be configured to deflect the plurality of spokes away from occupant compartment 840 during the collision event. In a further example, wheel mount 852 may include a lower control arm (e.g., similar to lower control arm 230 of FIG. 2 or lower control arm 730 of FIG. 7) configured to direct the plurality of radial spokes to deflector 860 during the collision event.

In an illustrative example, a system for managing wheel kinematics during a collision event of a vehicle may include a frame system (e.g., including frame member 802), a body system (e.g., body system 803), a frame coupler (e.g., frame coupler 804), and a deflector (e.g., deflector 860). The frame system may include a first pillar (e.g., hinge pillar 805) arranged at first position at a rear and laterally outside portion of a wheel well (e.g., wheel well 851). The body system includes an occupant compartment (e.g., occupant compartment 840). The frame coupler (e.g., frame coupler 804) at least partially affixes the frame system to the body system. The deflector is affixed to the frame coupler and faces the wheel (e.g., wheel 850). The deflector includes a first section (section 862) having a hollow structure configured to absorb energy from the collision event by plastically deforming, and a second section (e.g., section 861) arranged at an angle to the wheel and configured to deflect the wheel laterally outwards from the vehicle to prevent intrusion of the wheel into the occupant compartment during the collision event.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A system for managing wheel kinematics during a collision event, the system comprising:
    a recess arranged in a frame member;
    a pin arranged vertically in the recess and configured to couple a lower control arm to the frame member;
    a top plate defining a top of the recess comprising
        a first break-away region, comprising a first weakened region and a second weakened region, configured to fail under the collision event to allow the pin to move laterally out of a first through feature;
    a bottom plate defining a bottom of the recess comprising
        a second break-away region configured to fail under the collision event to allow the pin to move laterally out of a second through feature.

2. The system of claim 1, wherein the first weakened region comprises a first notch and the second weakened region comprises a second notch.

3. The system of claim 2, wherein the first break-away region further comprises:
    a first region of the top plate arranged between the first notch and the first through feature;
    a second region of the top plate arranged between the second notch and the first through feature, wherein:
    the first region and the second region are configured to fail during the collision event.

4. The system of claim 1, wherein the second break-away region comprises a first notch and a second notch.

5. The system of claim 4, wherein the second break-away region further comprises:
    a first region of the bottom plate arranged between the first notch and the second through feature;
    a second region of the bottom plate arranged between the second notch and the second through feature, wherein:
    the first region and the second region are configured to fail during the collision event.

6. The system of claim 1, wherein the first through feature comprises one of a circular hole or a slot.

7. The system of claim 1, wherein the second through feature comprises one of a circular hole or a slot.

8. The system of claim 1, wherein:
    the first break-away region is configured to fail under the collision event by fracturing; and
    the second break-away region is configured to fail under the collision event by fracturing.

9. A system for managing wheel kinematics during a collision event, the system comprising:
    a lower control arm configured to couple a wheel to a frame member, the lower control arm comprising a front portion and a rear portion;
    a front mount coupling the front portion to the frame member to form a first joint, wherein the front mount comprises a break-away region, comprising a first weakened region and a second weakened region, configured to fail under the collision event to allow the front portion to move laterally away from the front mount; and
    a rear mount coupling the rear portion to the frame member forming a second joint configured to constrain lateral displacement of the second portion during the collision event.

10. The system of claim 9, wherein the front mount comprises a through feature configured to accommodate a pin and constrain lateral motion of the pin, wherein the pin couples the front portion to the first mount, and wherein the break-away region is configured to fail during the collision event to allow the pin to move laterally out of the through feature.

11. The system of claim 9, wherein the first weakened region comprises a first notch and the second weakened region comprises a second notch.

12. The system of claim 11, wherein the break-away region further comprises:
    a first region arranged between the first notch and the through feature;
    a second region arranged between the second notch and the through feature, wherein the first region and the second region are configured to fail during the collision event.

13. The system of claim 9, wherein the break-away region is configured to fail during the collision event by fracturing.

14. The system of claim 9, wherein the front mount comprises:
    a top through feature;
    a bottom through feature vertically aligned with the top feature; and
    a pin extending vertically through the top through feature and the bottom through feature, wherein the front portion of the lower control arm is coupled to the pin, and wherein the pin constrains lateral motion of the front portion.

15. The system of claim 9, wherein the break-away region is configured to fail under a load of 100 kN.

16. A mount configured to constrain and release a front portion of a lower control arm, the mount comprising:
    a top plate comprising a top through feature;
    a bottom plate comprising a bottom through feature vertically aligned with the top through feature;
    a pin extending vertically through the top through feature and the bottom through feature, wherein the front portion of the lower control arm is coupled to the pin, and wherein the pin constrains lateral motion of the front portion; and
    a break-away region, comprising a first weakened region and a second weakened region, configured to fail during a collision event to allow the front portion to move laterally away from the top through feature.

17. The mount of claim 16, wherein the break-away region comprises:
    a first break-away region of the top plate; and
    a second break-away region of the bottom plate.

18. The mount of claim 16, wherein:
    the top plate is a top section of a C-shaped structure; and
    the bottom plate is a bottom section of a C-shaped structure.

19. The mount of claim 16, wherein the first weakened region comprises a first notch and the second weakened region comprises a second notch, wherein the first notch and the second notch reduce a tensile strength of the mount to fail under the collision event.

\* \* \* \* \*